United States Patent
Nagaoka et al.

(10) Patent No.: US 9,433,035 B2
(45) Date of Patent: Aug. 30, 2016

(54) WIRE ELECTRODE ANNEALING PROCESSING METHOD AND WIRE ELECTRIC DISCHARGE MACHINING DEVICE

(75) Inventors: Rintaro Nagaoka, Tokyo (JP); Zhengyong Liu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 651 days.

(21) Appl. No.: 13/885,716

(22) PCT Filed: Nov. 14, 2011

(86) PCT No.: PCT/JP2011/076215
§ 371 (c)(1),
(2), (4) Date: May 16, 2013

(87) PCT Pub. No.: WO2012/067078
PCT Pub. Date: May 24, 2012

(65) Prior Publication Data
US 2013/0334187 A1    Dec. 19, 2013

(30) Foreign Application Priority Data
Nov. 19, 2010   (JP) ................................. 2010-259276

(51) Int. Cl.
*H05B 3/00*    (2006.01)
*C21D 1/40*    (2006.01)
(Continued)

(52) U.S. Cl.
CPC .............. *H05B 3/0004* (2013.01); *B23H 7/10* (2013.01); *C21D 1/40* (2013.01); *C21D 9/525* (2013.01); *C21D 9/56* (2013.01); *C21D 11/00* (2013.01); *B23H 7/08* (2013.01)

(58) Field of Classification Search
CPC ........ C21D 1/40; C21D 9/525; C21D 11/00; C21D 9/56; B23H 7/10; B23H 7/08; H05B 3/0004
USPC ....... 219/69.11–69.14, 69.17, 69.18; 374/45, 374/141
See application file for complete search history.

(56) References Cited

U.S. PATENT DOCUMENTS 4,427,870 A * 1/1984 Inoue ...................... B23H 7/08
219/69.12
(Continued)

FOREIGN PATENT DOCUMENTS

JP   54 141490    11/1979
JP   7 41472      2/1992
(Continued)

OTHER PUBLICATIONS

JSME Mechanical Engineers' andbook, New Edition, Sixth Issue (Applied Instrumentation, B4, Material Engineering and Engineering Materials, Chapter 6: Nonferrous Materials, pp. (B4 69 and 70), (Dec. 1984).

(Continued)

*Primary Examiner* — Thien S Tran
(74) *Attorney, Agent, or Firm* — Oblon, McClelland, Maier & Neustadt, L.L.P (57) ABSTRACT

Values of a current and a voltage from a heating power supply device that supplies a current to a wire electrode and that heats the wire electrode are measured, a load resistance value is calculated by dividing the voltage value by the current value, a resistance increment of the wire electrode is calculated from an increased amount in the load resistance value with reference to the load resistance value and an estimated resistance value, a temperature rise value of the wire electrode is estimated based on a specific resistance of the wire electrode and a temperature coefficient of the specific resistance, and a state of carrying a current to the wire electrode is controlled based on the temperature rise value.

9 Claims, 3 Drawing Sheets

(51) Int. Cl.
*C21D 9/52* (2006.01)
*C21D 11/00* (2006.01)
*B23H 7/10* (2006.01)
*C21D 9/56* (2006.01)
*B23H 7/08* (2006.01)

(56) References Cited

U.S. PATENT DOCUMENTS

| | | | | |
|---|---|---|---|---|
| 4,474,825 A | * | 10/1984 | Schmidt | H01B 13/00 118/620 |
| 5,380,974 A | | 1/1995 | Kaneko | |
| 5,590,964 A | | 1/1997 | Obara et al. | |
| 5,725,307 A | | 3/1998 | Obara et al. | |

FOREIGN PATENT DOCUMENTS

| | | |
|---|---|---|
| JP | 5 4125 | 1/1993 |
| JP | 5 177443 | 7/1993 |
| JP | 6 31536 | 2/1994 |
| JP | 3057953 | 9/1994 |
| JP | 2000 94225 | 4/2000 |
| JP | 2003 94253 | 4/2003 |
| JP | 2003 94254 | 4/2003 |
| JP | 2003 285227 | 10/2003 |

OTHER PUBLICATIONS

International Search Report Issued Feb. 14, 2012 in PCT/JP11/076215 filed Nov. 14, 2011.

* cited by examiner

WIRE ELECTRODE ANNEALING PROCESSING METHOD AND WIRE ELECTRIC DISCHARGE MACHINING DEVICE

FIELD

The present invention relates to a wire electric discharge machining device that generates a discharge phenomenon between a workpiece and a wire electrode and performs machining on the workpiece, and more particularly to an annealing processing method for a wire electric discharge machining device for arranging a pair of electrodes at predetermined two points on a wire electrode, respectively, for applying a current to heat the wire electrode via the electrodes with a tension applied to the wire electrode, and for correcting a bending tendency between the two points.

BACKGROUND

An automatic wire connection device for connecting a wire electrode of a wire electric discharge machining device performs a process of improving a connection performance, by annealing and straightening a wire having a bending tendency. For example, conventionally, Patent Literature 1 proposes a technique of heating and annealing a wire electrode to lessen the bending tendency of a wire electrode so as to improve the machining capability of a wire electric discharge machining device. Patent Literature 2 discloses a technique of measuring heat stretch of a wire electrode and using the measured heat stretch so as to control the temperature of the wire electrode to a predetermined temperature during an annealing process. Patent Literature 3 describes a method of estimating the temperature of a wire electrode that is being machined from a current value and a resistance value. Furthermore, as shown in FIG. 51 and FIG. 53 of Non Patent Literature 1, it is known that mechanical properties of brass, which is a material often used as the material of a wire electrode of an electric discharge machining device, changes depending on a temperature.

CITATION LIST

Patent Literatures

Patent Literature 1: Japanese Patent Application Laid-open No. 54-141490 (lines 15 to 20, left lower column on page 462)
Patent Literature 2: Japanese Patent Application Laid-open No. 2003-94253 (paragraph [0008] on page 3)
Patent Literature 3: Japanese Patent Application Laid-open No. 6-31536 (paragraphs [0015] to [0025] on page 3)

Non Patent Literature

Non Patent Literature 1: JSME Mechanical Engineers' Handbook, New Edition, Sixth Issue (Applied Instrumentation, B4, Material Engineering and Engineering Materials, Chapter 6: Nonferrous Materials B4-69, 70)

SUMMARY

Technical Problem

The method disclosed in Patent Literature 1 describes means for measuring a wire temperature and a control over a current carried to a wire electrode based on the measurement result so as to control the heating temperature of the wire electrode to be equal to or lower than a recrystallization temperature. However, specific measures and a specific method for measuring the temperature of the wire electrode are not described. Generally, there are two types of measuring methods: a contact measuring method using a thermocouple as a method of measuring an object temperature, and a noncontact measuring method of measuring a thermal radiation amount. The diameter of a wire used for the electric discharge machining is as small as about 0.02 to 0.3 [mm]. With the contact measuring method, the wire temperature changes depending on the transmission of heat to the contacted object and therefore it is difficult to accurately measure the temperature. In addition, with the noncontact measuring method, sufficient sensitivity is not obtained because of the small diameter of the wire, and a measuring device is too complicated to easily mount the device on the electric discharge machining device. Therefore, it is difficult to actually measure the temperature.

With the method disclosed in Patent Literature 2, attention is paid to expansion due to heat of the material of a wire, and a change in the length due to the expansion is measured, thereby attempting to detect a temperature rise. However, at the time of straightening the wire so as to improve the insertion performance of the automatic wire-connection device, a process of applying a tension to the wire and stretching the wire during heating to thereby improve the straightness and to reduce a line diameter is often performed. For example, when the wire temperature is increased by 300° C., the wire is stretched by about 0.6% of the length, but the stretch caused by the tension is as high as several percents of the length. Therefore, no consideration is given to the stretch caused by the tension, and it is difficult to accurately detect the temperature from the stretch.

A method of estimating a wire temperature from a temperature coefficient of a resistance value of a known wire electrode material is considered. For the estimating method, a temperature measurement method is applied that uses a resistance temperature sensor that detects a temperature based on a change in a resistance value relative to the temperature of a platinum wire or the like. A voltage between annealing electrodes connected to a wire electrode is measured directly or through a bridge circuit at the time of performing heat treatment on the wire electrode. In the method disclosed in Patent Literature 3, it is described that a resistance value is obtained from a current value and a voltage value and then a temperature is estimated from the resistance value, although it is not mentioned that a temperature coefficient is used. Therefore, it is considered that the method disclosed in Patent Literature 3 uses a similar principle to that of the resistance temperature sensor. In a case of a temperature sensor using the resistance temperature sensor, the resistance value of a wiring part up to the resistance temperature sensor is a measurement error, and three-wire or four-wire wiring method is adopted so that the resistance value of the wiring part is negligible. However, the wire electrode of the wire electric discharge machining device is disposable, and a new wire electrode is always unreeled and the annealing electrodes are connected to the new wire electrode. The annealing electrodes are often designed to be movable so as to prevent the annealing electrodes from becoming an obstacle during the movement of a wire other than the annealing process. Accordingly, the contact resistance between each of the annealing electrodes and the wire electrode varies, depending on the conditions of the contact with the wire electrode at times the wire moves and the annealing electrodes contacts the wire.

Furthermore, as described above, the wire electrode is stretched during the annealing process. The conventional temperature measurement method using the resistance temperature sensor or the method disclosed in Patent Literature 3 does not take into consideration this variation in contact resistance and the stretch of the wire electrode. Because the variation and the stretch have a large influence on the estimated temperature, it is difficult to apply this method to the wire electric discharge machining device. The method disclosed in Patent Literature 3 refers to the method of measuring the voltage using the noncontact electrodes. However, because of the noncontact property, the contact resistance is not present, and it is difficult to ensure that the voltage and the resistance can be accurately measured. The noncontact property causes a low sensitivity problem, and the resistance value of the wire is quite low unless the wire diameter is very small. Therefore, it is difficult to accurately measure the resistance value of the wire.

The present invention has been achieved to solve the above problems. An object of the present invention is to provide a wire-electrode annealing processing method and a wire electric discharge machining device that are capable of detecting a temperature of a wire electrode with a simple method, considering the influence of stretching the wire electrode at the same time, and improving a process of straightening a wire through the annealing process by maintaining the temperature of the wire electrode at a predetermined temperature at a time of performing the annealing process on the wire electrode.

Solution to Problem

The present invention is directed to a wire electrode annealing processing method and a wire electric discharge machining device.

One aspect of the present invention relates to a wire electrode annealing processing method for a wire electric discharge machining device that generates a discharge phenomenon between a workpiece and a wire electrode to perform machining on the workpiece, wherein the wire electric discharge machining device arranges a pair of annealing electrodes at predetermined two points on the wire electrode, respectively, carries a current to the wire electrode via the annealing electrodes, with a tension applied to the wire electrode, to heat the wire electrode, and corrects a bending tendency of the wire electrode between the two points. The wire electrode annealing processing method includes measuring values of a current and a voltage from a heating power supply device that heats the wire electrode by carrying a current to the wire electrode; calculating a load resistance value by dividing the voltage value by the measured current value; calculating a resistance increment of the wire electrode from an increased amount in a load resistance value with reference to a load resistance value right after starting heating the wire electrode and a resistance value of the wire electrode itself at a normal temperature; estimating a temperature rise value of the wire electrode based on a preset specific resistance of the wire electrode and a temperature coefficient of the specific resistance; and controlling a state of carrying a current to the wire electrode based on an estimated temperature rise value.

Another aspect of the present invention relates to a wire electric discharge machining device that generates a discharge phenomenon between a workpiece and a wire electrode to perform machining on the workpiece, arranges a pair of annealing electrodes at predetermined two points on the wire electrode, respectively, carries a current to the wire electrode via the annealing electrodes, with a tension applied to the wire electrode, to heat the wire electrode, and corrects a bending tendency of the wire electrode between the two points. The wire electric discharge machining device includes a heating power supply device that heats the wire electrode by supplying electric power to the wire electrode; a current and voltage measurement unit that measures values of a current and a voltage from the heating power supply device that carries a current to the wire electrode; an estimation unit that calculates a load resistance value by dividing the voltage value by the measured current value, calculates a resistance increment of the wire electrode from an increased amount in the load resistance value with reference to a load resistance value right after starting heating the wire electrode and a resistance value of the wire electrode itself at a normal temperature, and estimates a temperature rise value of the wire electrode based on a preset specific resistance of the wire electrode and a temperature coefficient of the specific resistance; and a control unit that controls a state of carrying a current to the wire electrode based on the estimated temperature rise value.

Advantageous Effects of Invention

According to the present invention, although a temperature during an annealing process largely influences a processing result of an annealing process, it is possible to detect a wire temperature during the annealing process with a simple method based on sensing of a current value and a voltage value of a heating power supply. Therefore, it is possible to appropriately control the heating depending on the conditions of the wire temperature, and to improve the connection performance by an automatic wire connection device because the straightness of the wire improves due to the enhanced capability of removing a wire bending tendency through the annealing process.

DESCRIPTION OF EMBODIMENTS

Exemplary embodiments of a wire-electrode annealing processing method for a wire electric discharge machining device and a wire electric discharge machining device according to the present invention will be explained below in detail with reference to the accompanying drawings. The present invention is not limited to the embodiments.

First Embodiment

Figure 1:
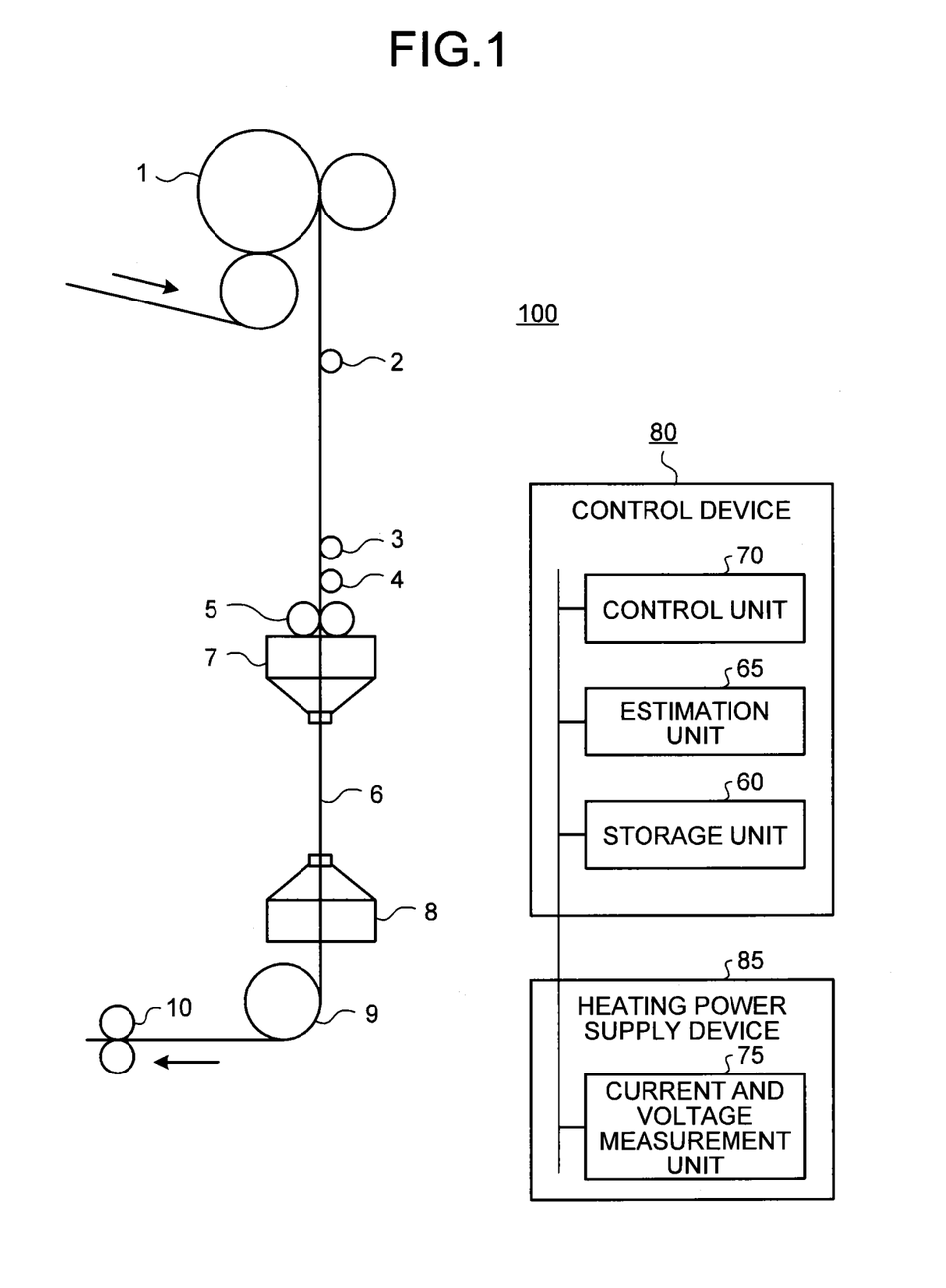
FIG. 1 depicts a configuration of a wire electric discharge machining device according to a first embodiment of the present invention.

FIG. 1 depicts a configuration of a wire electric discharge machining device according to a first embodiment of the present invention. As shown in FIG. 1, a wire electric discharge machining device 100 includes tension setting rollers 1, a first annealing electrode 2, a first cutting electrode 3, a second annealing electrode (also as a second cutting electrode) 4, pinch rollers 5, an upper guide block 7, a lower guide block 8, a lower roller 9, and recovery rollers 10 that are arranged along a path of a wire electrode 6 in this order.

Furthermore, the wire electric discharge machining device 100 also includes a control device 80 that controls operations performed by the above elements and a heating power supply device 85 that supplies electric power to the wire electrode 6 when an annealing process is performed. A current and voltage measurement unit 75 that measures values of a current and a voltage applied to the wire electrode 6 and that outputs the measured current and voltage is provided in the heating power supply device 85. The control device 80 includes an estimation unit 65 that estimates a temperature rise value of the wire electrode 6, a control unit 70 that controls a state of carrying a current to the wire electrode 6 based on the estimated temperature rise value, and a storage unit 60 that stores therein various settings. The estimation unit 65 divides the voltage value by the current value, based on the current value and the voltage value measured by the current-voltage measurement unit 75, thereby calculating a load resistance value. Subsequently, the estimation unit 65 calculates a resistance increment of the wire electrode 6, from an increased amount of a load resistance value with reference to a load resistance value right after starting the annealing process and a resistance value of the wire electrode 6 itself at a normal temperature. Furthermore, the estimation unit 65 estimates the temperature rise value of the wire electrode 6, based on a preset specific resistance of the wire electrode 6 and a temperature coefficient of the specific resistance. Although a predetermined electric connection exists between each of the elements around the wire electrode 6 shown on the left of FIG. 1 and the control device 80 and the heating power supply device 85, an illustration thereof is omitted because the drawing is complicated if the predetermined electric connection is added to the drawing.

The wire electric discharge machining device 100 is a machine tool that intermittently generates discharges between the stretching wire electrode 6 and a workpiece and that performs machining on the workpiece by discharge generated energy. The wire electrode 6 is supplied in a state of being wound around a wire bobbin (not shown), reaches the lower roller 9 from the tension setting rollers 1 through the upper guide block 7 and the lower guide block 8, changes directions at the lower roller 9, and is then discharged via the recovery rollers 10. The workpiece is arranged between the upper guide block 7 and the lower guide block 8 and machined by a discharge phenomenon.

To start machining the wire electrode 6, it is necessary to pass through the wire electrode 6 to the recovery rollers 10. This passing process is performed either manually or by an automatic wire connection device (not shown) included in the wire electric discharge machining device 100. The automatic wire connection device is a device that automatically passes the wire electrode 6 led to near the front of the upper guide block 7 through the recovery rollers 10 via the lower guide block 8 and the lower roller 9. The automatic wire connection device can thereby automatically connect the wire electrode 6 during disconnection of the wire electrode 6, and even when an operator is not always present before the wire electric discharge machining device 100, it is possible to continuously operate the wire electric discharge machining device 100.

During the operation of the automatic wire connection device, it is necessary to feed the wire electrode 6 by the tension setting rollers 1 or the like and to insert a tip end of the wire electrode 6 led from the upper guide block 7 into an inlet of the lower guide block 8. However, the wire electrode 6 supplied while being wound around the wire bobbin contains a flexure referred to as "bending tendency", that is, a curl. The tip end of the wire electrode 6 deviates from an outlet of the upper guide block 7 as it is and is difficult to introduce to the inlet of the lower guide block 8. Accordingly, to secure introducing the curled wire electrode 6 to the inlet of the lower guide block 8, a method is adopted such as correcting the wire electrode 6 to straighten the wire electrode 6 by injecting a liquid jet from the outlet of the upper guide block 7, or performing heat treatment on the wire electrode 6 referred to as "annealing process" to remove the flexure of the wire electrode 6 and to straighten the wire electrode 6.

The annealing process is treatment also referred to as "annealing". The wire electrode 6 has a strain accumulated therein by being wound around the wire bobbin or by being bent while being fed by the rollers. As a result, the wire electrode 6 has the bending tendency. While a normally used material of the wire electrode 6 is brass, the strain accumulated in the brass is corrected by heating the wire electrode 6 to thereby straighten the wire electrode 6. The heating power supply device 85 supplies a current to the wire electrode 6 between the first annealing electrode 2 and the second annealing electrode 4 that are in contact with the wire electrode 6, and generates Joule heating by a resistance value of the wire electrode 6, thereby heating the wire electrode 6. At the time of the heating, the brass thermally expands to thereby generate stretch of the wire electrode 6. However, the pinch rollers 5 fixedly pinch the wire electrode 6 therebetween and the tension setting rollers 1 absorb the stretch of the wire electrode 6 so as to prevent the wire electrode 6 from bending by this stretch. Furthermore, for the purpose of making the wire electrode 6 thinner to facilitate insertion of the wire electrode 6, a tension is applied to the wire electrode 6 that is being heated to extend the wire electrode 6. After the annealing process, the heating-power supply device 85 further applies a current to the wire electrode 6 between the first cutting electrode 3 and the second annealing electrode (also as the second cutting electrode) 4, thereby blowing out the wire electrode 6. In this way, the wire straightened by the annealing process is passed through machining target holes and grooves (not shown) by the upper guide block 7 and inserted into the lower guide block 8 after a wire recovery mechanism (not shown) removes the cut tip end of the wire electrode 6 remaining in the upper guide block 7.

An amount and time of the current carried during the annealing process are determined by what temperature the wire electrode 6 is heated to. If the temperature rise of the heated wire electrode 6 is insufficient, the strain is not sufficiently removed and the obtained straightness of the wire is not satisfactory. If the temperature is too high, defects occur that a force for feeding the wire electrode 6 is insufficiently transmitted and the wire electrode 6 bends when the wire electrode 6 is caught in the inlet during the insertion, because of reductions in an elastic limit, a hardness, and a mechanical strength of the wire electrode 6. If the current amount is excessive, the wire electrode 6 is often molten down. It is known that particularly brass undergoes a rapid change in the mechanical strength near a temperature zone referred to as "recrystallization temperature". It is very important to keep the temperature during the heating in a target temperature zone, when performing the annealing process with both the removal of the strain and the strength of the wire electrode 6 taken into consideration.

Meanwhile, because the wire electrode 6 is heated by the Joule heating by carrying a current, a quantity of produced heat Q [J] is represented by the following Equation (1):

$$Q = \rho \frac{L}{A} i^2 t \qquad (1)$$

where $\rho[\Omega \cdot m]$ is a relative resistance of the wire electrode 6, A [m$^2$] is a cross-sectional area, L [m] is a length, i [A] is an amount of a carried current, and t [s] is a current-carrying time.

As long as a heat capacity C [J/K] of the wire electrode 6 is known, a temperature rise T [K] of the wire electrode 6 due to the heating is considered to be obtained from a relation between the quantity of heat and the specific heat as represented by the following Equation (2):

$$T = \frac{Q}{C} \qquad (2)$$

However, a large difference is actually recognized between the temperature rise value obtained from this Equation and an actual temperature rise value. This is because the heat of the wire electrode 6 during the heating is lost by the conduction of heat to contact parts with the first annealing electrode 2 and the second annealing electrode 4, the transmission of heat to the atmosphere, and thermal radiation that is thermal dissipation derived from electromagnetic waves. Besides, because a diameter of the normally used wire electrode 6 is as small as 0.3 [mm] or less, a ratio of a surface area to a volume of the wire electrode 6 is high and the thermal dissipation is high in degree. Furthermore, surrounding environments, such as temperature and wind, in which the wire electrode 6 is heated influence the thermal dissipation. For these reasons, it is difficult to accurately estimate the temperature rise of the wire electrode 6 from the relation between the quantity of heat applied to the wire electrode 6 and the heat capacity.

Further, according to the temperature estimation using the heat capacity and the Joule heating, the temperature of the wire electrode 6 rises in proportion to the time. However, the temperature rise of the wire electrode 6 actually stops at a temperature at which the quantity of heat supplied to the wire electrode 6 is balanced with the quantity of heat lost from the wire electrode 6. Using this phenomenon, it is possible to prevent the temperature from excessively rising by setting a constant current value during the annealing. However, it takes time until the temperature rises and becomes constant, which increases the time necessary for the annealing process. Furthermore, the influence of the environments and the like changes the degree of the temperature rise. For these reasons, it is desired to adopt a method of directly measuring the temperature of the wire electrode 6 so as to appropriately keep the temperature of the wire electrode 6 during the annealing.

Generally, at the time of temperature detection, either a contact temperature sensor such as a thermocouple or a noncontact temperature sensor such as a radiation temperature sensor is used. However, in a case of the contact temperature sensor, the heat capacity of the wire electrode 6 itself is quite small, so that a heat capacity of the temperature sensor influences the temperature rise. Therefore, it is difficult to accurately measure the temperature. On the other hand, in a case where the noncontact temperature sensor is used, the temperature can be measured without the influence on the wire electrode 6. Nevertheless, it is difficult to incorporate the noncontact temperature sensor in the electric discharge machining device and to use the noncontact temperature sensor for reasons that the device is relatively expensive and only an insufficient thermal radiation amount is obtained because of the small diameter of the wire electrode 6.

On the other hand, the present embodiment proposes an annealing processing method that can easily estimate the temperature rise of the wire electrode 6. In the proposed configuration, the heating power supply device 85, which heats the wire electrode 6, includes the current and voltage measurement unit 75 that measures a value of a current carried to the wire electrode 6 during the annealing process and a voltage value across the wire electrode 6. Furthermore, these pieces of measured information can be transmitted to the control device 80. The control device 80 calculates a load resistance value r [Ω] of the power supply device from an obtained voltage value v [V] and a current value i [A], by the following Equation (3):

$$r = \frac{v}{i} \qquad (3)$$

Although the resistance value can be calculated voluntarily, the calculation is limited mainly to a current-carrying state because the resistance value is divided by zero and becomes infinite in a state of carrying no current.

On the other hand, it is known that a resistance and a temperature of an object satisfy a relation represented by the following Equation:

$$R = R_0 \{1 + \alpha_0 (t - t_0)\}$$

where R and $R_0$ indicate resistances at temperatures t and $t_0$, respectively, and $\alpha_0[1/°C.]$ indicates a temperature coefficient with respect to the resistance. This Equation is transformed to the following expression (a):

$$(R - R_0)/R_0 = \alpha_0 (t - t_0) \qquad (a)$$

That is, a temperature change $t - t_0$ is derived as long as the resistances R and $R_0$ and the temperature coefficient $\alpha_0$ are known.

However, when the temperature rise of the wire is calculated using the resistance value obtained by the Equation (3), the temperature rise and the resistance value increase often do not match the temperature coefficient that is characteristic of the material of the wire. The reason is considered as follows. The load resistance value obtained by the Equation (3) includes not only a resistance value of the wire but also contact resistances between the wire and the wire electrodes and wiring resistances of the current and voltage measurement unit and the heating power supply device. Because a brass wire for annealing having a length of about 10 centimeters and a diameter of 0.1 millimeter to 0.33 millimeter has a resistance value of about 0.1Ω to 1Ω, it is understood that even the contact resistances and wiring resistance of about 0.1Ω to 1Ω have a larger influence than that of the resistance value of the wire. Furthermore, because the heating electrodes repeatedly attach or detach the wire whenever the annealing process is performed on a newly reeled out wire, contact states are not constant. Furthermore, the line diameter of the wire may often change, and a stain, an oxide, or the like may often adhere to the wire and surfaces of the heating electrodes. Therefore, it is considered that the contact states change whenever the annealing process is performed on the wire.

For example, it is assumed that the contact resistance is $R_C$, the wiring resistance is $R_L$, the resistance value increase due to the temperature rise of the wire is dr, and the resistance value of the wire itself at a normal temperature is $R_W$. On this assumption, the following relation is considered to be satisfied.

$$R_0 = R_W + R_C + R_L, R = R_W + dr + R_C + R_L \quad (b)$$

Therefore, when the temperature rise is estimated using the load resistance, a left side of the Equation (a) is:

$$\{(R_W + dr + R_C + R_L) - (R_W + R_C + R_L)\}/(R_W + R_C + R_L) = dr/(R_W + R_C + R_L).$$

That is, a difference arises in the temperature coefficient $\alpha_0$ by $R_C$ and $R_L$ included in a denominator. Furthermore, $R_W$ changes for every annealing process and has a large value, so that it is difficult to eliminate the influence of the resistance value $R_W$ of the wire by correcting the estimated result of the temperature by a certain value.

To prevent the estimated temperature value from becoming inaccurate owing to the influence of the changing contact resistances and wiring resistance as described above, an accurate increased value of the wire temperature is calculated by performing computation using a method described below.

Figure 2:
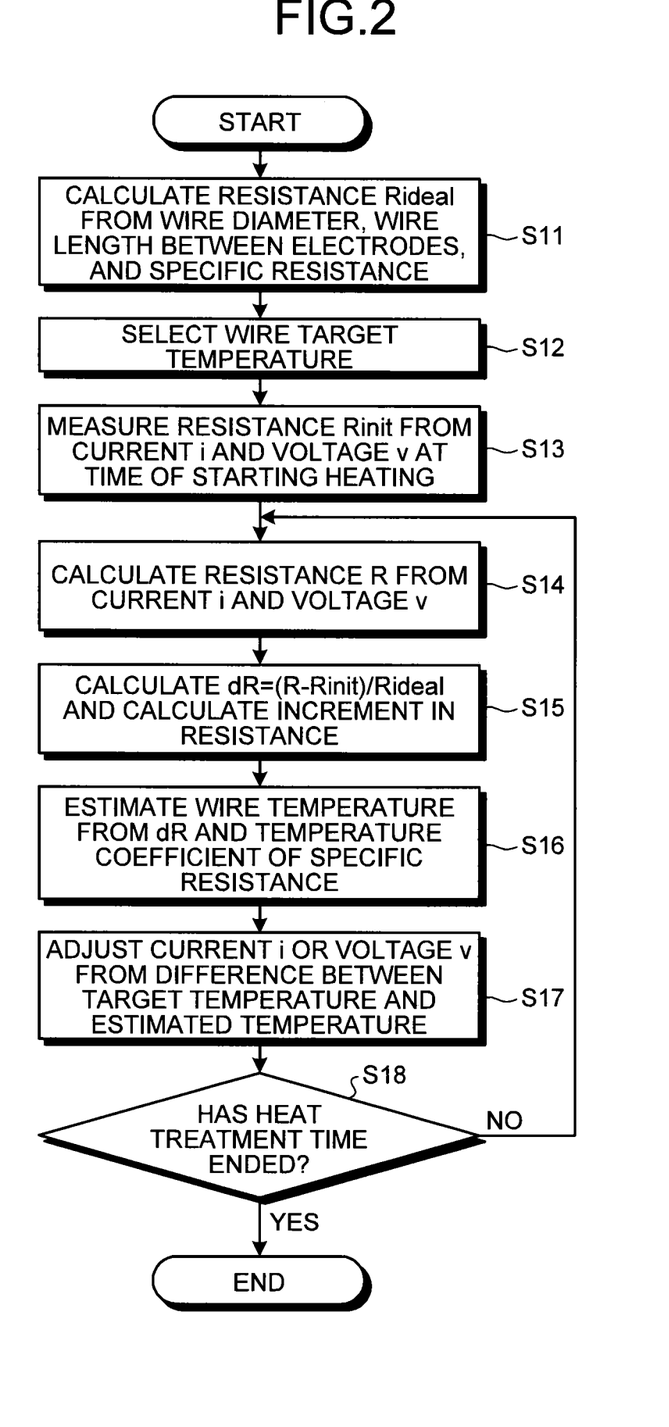
FIG. 2 is a sequence diagram of an example of procedures of an annealing process according to the embodiment.

FIG. 2 is a sequence diagram of an example of procedures of the annealing process according to the present embodiment. Before starting the annealing process, an ideal resistance value Rideal [Ω] of the wire electrode 6 stretching between the annealing electrodes 2 and 4 is calculated (Step S11). This can be calculated from the material and the line diameter of the wire electrode 6 to be used and a length between the annealing electrodes. For example, when the material of the wire electrode 6 is brass, a specific resistance value of the brass is assumed as about 6.3×10−8 [Ω·m]. Providing that the line diameter is 0.2 [mm] and the length is 250 [mm], the ideal resistance value is about 0.5 [Ω]. The ideal resistance value of the wire electrode 6 is not necessarily calculated every time, but a wire target temperature can be selected from a list of values calculated or measured in advance (Step S12). Similarly, it is preferable that the specific resistance value can be made selectable from a list according to the type of the wire electrode 6. This calculation corresponds to obtaining the resistance value $R_W$ of the wire electrode itself described previously.

Next, the annealing process starts, and current carrying starts. At this time, a resistance value Rinit [Ω] is recorded from values of a current and a voltage right after starting carrying the current (at the time of starting heating) (Step S13). Because the contact resistance value of the wire is considered to change for every annealing process, the resistance value Rinit is calculated and recorded whenever the annealing process is performed. When the time is right after starting carrying the current, the temperature of the wire electrode 6 is considered to be nearly equal to a room temperature. Thus, the resistance value Rinit is the resistance value at a room temperature. Next, a resistance value R [Ω] at the moment is calculated from the values of the current and the voltage (Step S14), and a resistance increment dR [%] is calculated from these values by using the following Equation (4) (Step S15). Rinit and R include not only the resistance of the wire electrode but also the wiring resistance of a wiring led to the annealing electrodes 2 and 4, and the contact resistances between the annealing electrodes 2 and 4 and the wire electrode 6.

$$dR = \frac{R - R_{init}}{R_{ideal}} \times 100 \quad (4)$$

"R-Rinit" represents an increased value of a resistance value of the wire electrode 6 within the calculated resistance value. By holding the value of the Rinit and using it in calculation, it is possible to eliminate the influence of the contact resistances expected to vary for every annealing process. In a calculation equation of the dR, the Rideal is used in a denominator without using the Rinit. The reason is to avoid the fact that the value of the dR does not accurately represent the temperature rise value of the wire electrode 6, because the resistance value R calculated from the current and the voltage includes not only the resistance of the wire electrode 6 itself but also the wiring resistance from a power supply to the electrodes and the contact resistances between the wire electrode 6 and the electrodes. Although magnitudes of the wiring resistance value and the contact resistance value are small, these resistance values are not negligible, because the resistance value of the wire electrode 6 becomes lower as the line diameter of the wire electrode 6 is larger. This is why the ideal resistance value Rideal is used as the resistance value of the wire electrode 6 that serves as the denominator of the resistance increment. Assuming that the R and the Rinit are R and $R_0$ in the Equation (b), respectively and that the Rideal is $R_W$, the Equation (4) is paraphrased as follows:

$$dR = \{(R_W + dr + R_C + R_L) - (R_W + R_C + R_L)\}/R_W \times 100 = dr/R_W \times 100$$

Therefore, it is possible to calculate the increase of the resistance value of the wire electrode itself. It becomes thereby possible to eliminate the influence of the wiring resistance and the varying contact resistances and to calculate the increase ratio of the resistance value of the wire. Alternatively, in place of using the Rideal, a resistance value Rbase from the power supply to the wire electrode can be measured in advance, and the resistance increment can be calculated using the following Equation (5):

$$dR = \frac{R - R_{init}}{R_{init} - R_{base}} \times 100 \quad (5)$$

However, the accuracy of the resistance increment is lower because the resistance increment at this time includes the influence of the contact resistances varying for every line diameter and every line type of the wire electrode and every performance of the annealing process.

A specific resistance of a conductor changes and increases due to a temperature. Accordingly, the value of the calculated dR increases as the temperature of the wire electrode 6 rises by carrying a current. For example, according to FIG. 53 of Non Patent Literature 1 mentioned above, the specific resistance of 65/35 brass with 22.4% cold-working maintained has a temperature coefficient α of about 7.5×10−11 [Ω·m/° C.] and is represented as 7.4×10−8+α (T-20) for a temperature of T° C. with reference to about 20° C. Based on this calculation, the resistance value changes by about 0.1 [%/C]. That is, a value of "dR/0.1+room temperature" can be regarded as a wire temperature. By making the specific resistance and the temperature coefficient of the specific resistance selectable according to the type of the wire electrode 6, it is possible to estimate the temperature of the wire electrode 6 of various types (Step S16). For example, the current or voltage is adjusted from a difference between a target temperature and the estimated temperature (Step S17), and the adjustment is repeated until the annealing process (heating treatment) ends (Step S18). At the time of calculating the wire temperature rise from the Equation (a) using the ideal resistance value Rideal, the Rideal is used in place of the simply measured load resistance value $R_0$, and the left side of the Equation (a) can be calculated by the use of the following term:

(R−Rideal)/Rideal

However, actually this method is unable to sufficiently improve the accuracy. The reason is as follows: When $R=R_W+dr+R_C+R_L$ and Rideal=$R_W$, the following equation is obtained:

(R−Rideal)/Rideal=$(dr+R_C+R_L)/R_W$

Because of this, at the time of calculating the wire temperature rise from the Equation (a), the contact resistances and the wiring resistance influence the wire temperature rise.

By the procedures described above, the temperature of the wire electrode 6 to which the current is being carried can be estimated. With this method, when heating the wire electrode 6 at a constant current, for example, it is possible to finish carrying the current at the moment when the temperature reaches a target temperature to prevent the temperature from excessively rising or to detect that the temperature of the wire electrode 6 is unable to reach a target temperature because of an insufficient current amount or excessive cooling from surroundings during the annealing process. Furthermore, by changing the current amount during the annealing process, for example, it is possible to carry the current in large amounts right after starting carrying the current to increase a heating amount and to reduce a required time until the temperature of the wire electrode 6 reaches the target temperature. As indicated by the annealing process sequence shown in FIG. 2, the annealing process can be uniformly performed on the wire electrode 6, by adjusting the current amount after the temperature reaches a target temperature and keeping the constant temperature for a predetermined time. Thus, various controls can be executed. With this control, even under the conditions of disturbance from surrounding environments such as wind, it is possible to realize effects of performing the annealing process and to achieve such effects as an improvement in the straightness of the wire electrode 6, the prevention of the loss of the strength of the wire electrode 6 due to an excessive temperature rise, and the reduction of the annealing process time.

As described above, according to the wire electrode annealing processing method of the present embodiment, the values of a current and a voltage from the heating power supply device 85 that heats the wire electrode 6 by carrying a current to the wire electrode 6 are measured, the load resistance value is calculated by dividing the voltage value by the measured current value, the resistance increment of the wire electrode is calculated from the increased amount in the load resistance value with respect to the load resistance value right after starting heating and from the estimated resistance of the wire electrode itself at a normal temperature, the temperature increment of the wire electrode is estimated based on the preset specific resistance of the wire electrode and the temperature coefficient of the specific resistance, and the state of carrying the current to the wire electrode is controlled based on the estimated temperature rise value. According to this, it is possible to accurately detect the temperature of the wire electrode 6 during the annealing process, with a simple method of measuring the values of the current and the voltage from the heating power supply device 85 and calculating based on these values, and to perform the annealing process at the appropriate temperature. Therefore, it is possible to improve the straightness of the wire electrode having the bending tendency and to reduce the time required for the annealing process.

Furthermore, the wire electric discharge machining device 100 according to the present embodiment is configured to include the heating power supply device 85 that heats the wire electrode 6 by supplying electric power to the wire electrode 6, the current and voltage measurement unit 75 that measures the values of a current and a voltage and outputs the current and the voltage for supplying the current to the wire electrode 6, the estimation unit 65 that calculates the load resistance value by dividing the voltage value by the measured current value, that calculates the resistance increment of the wire electrode 6 from the increased amount in the load resistance value with reference to the load resistance value right after starting heating the wire electrode 6 and from the estimated resistance value of the wire electrode 6 itself at a normal temperature, and that estimates the temperature rise value of the wire electrode 6 based on the preset specific resistance of the wire electrode 6 and the temperature coefficient of the specific resistance, and the control unit 70 that controls the state of carrying the current to the wire electrode 6 based on the estimated temperature rise value. Therefore, it is possible to accurately detect the temperature of the wire electrode 6 that is subject to the annealing process. Because the annealing process is performed at the appropriate temperature, it is possible to easily straighten the wire electrode having the bending tendency and to reduce the time required for the annealing process.

Second Embodiment

When performing an annealing process on the wire electrode 6, thermal expansion occurs as the temperature of the wire electrode 6 rises, and the wire electrode 6 is stretched and slackened. When the annealing process is performed on the wire electrode 6 in a slackened state, the wire electrode 6 is insufficiently straightened. Accordingly, when performing the annealing, it is necessary to apply a tension to the wire electrode 6 to pull the wire electrode 6 and to always keep the wire electrode 6 in a straightened state. This process is performed by fixing the wire electrode 6, with the wire electrode 6 pinched between the pinch rollers 5, and by applying a tension to the wire electrode 6 from the tension setting rollers 1, shown in FIG. 1, for example. Furthermore, processes, such as pulling and stretching the wire electrode 6, improving the straightness of the wire electrode 6, and making the wire electrode 6 thinner to facilitate inserting the wire electrode 6 into the holes, are performed.

Even when the wire electrode 6 is stretched as described above to increase the length of the wire electrode 6, the distance between the first and second annealing electrodes 2 and 4 does not change, but the resistance increases when the cross-sectional area of the wire electrode 6 decreases. For example, it is assumed that the length L of the wire electrode 6 is increased to αL that is α times as large as L as a result of the stretch. At this time, because a volume of the wire electrode 6 is supposed to be constant even at the time of stretching, r and r' satisfy the following relation expressed by the Equations (6) and (7), where r indicates a radius of the wire electrode 6 before the stretch and r' indicates a radius thereof after the stretch.

$$\pi r^2 L = \pi r'^2 \alpha L \quad (6)$$

$$r' = r\sqrt{\frac{L}{\alpha L}} = \frac{r}{\sqrt{\alpha}} \quad (7)$$

Next, a resistance value R' of the wire electrode 6 after the stretch is represented by the following Equation (8).

$$R' = \rho \frac{L}{\pi r'^2} = \rho \frac{L}{\pi \frac{r^2}{\alpha}} = \alpha \rho \frac{L}{\pi r^2} \quad (8)$$

Although the length of the wire electrode 6 is increased to αL, the length used in the calculation remains L because the resistance value of interest is that of the wire electrode 6 between the first and second annealing electrodes 2 and 4. The resistance value R of the wire electrode 6 before the stretch is expressed as follows:

$$R = \rho \frac{L}{\pi r^2} \quad (9)$$

The resistance value R' of the wire electrode 6 after the stretch is expressed as follows using the R:

$$R' = \alpha R \quad (10)$$

It is understood from this fact that when the length of the wire electrode 6 is increased to β times as long by the stretch of the wire electrode 6, the resistance value of the wire electrode 6 is also increased to β times as large. A stretching amount by which the wire electrode 6 is stretched can be measured by determining how many times the tension setting rollers 1 has rotated, for example. It is understood from this fact that the resistance increase of the wire electrode 6 calculated from the values of a current and a voltage of a heating power supply includes not only an increase in specific resistance but also an increase in resistance corresponding to the stretching amount. Accordingly, when stretching the wire electrode 6, the stretching amount at that time is measured at the same time. By correcting the increment in the resistance value based on the stretching amount, the temperature rise can be detected more accurately. For example, when the wire electrode 6 is stretched by 5%, it suffices to estimate the temperature using a value obtained by dividing the dR by 1.05.

As described above, according to the wire electrode annealing processing method of the present embodiment, the tension applied to the wire electrode 6 during the annealing process is set, the stretch of the wire electrode 6 during the annealing process is detected, the decrease in the cross-sectional area of the wire electrode 6 is estimated based on the detected stretching amount, the increased amount in the resistance value of the wire electrode 6 based on the estimated decrease in the cross-sectional area is calculated, and the estimated value of the temperature of the wire electrode 6 is corrected using this increased amount. Accordingly, by estimating the increase in the resistance value due to the stretch of the wire electrode 6 and removing this increase from the increase in temperature, it is possible to more accurately estimate the temperature as a result of the increase in the resistance value.

Third Embodiment

Although heat stretch occurs to the wire electrode 6 by thermal expansion when heating the wire electrode 6, the value of this heat stretch can be calculated from an expansion coefficient. For example, an expansion coefficient of the brass is about $1.8 \times 10^{-5}$ [$1/°$ C.] and the heat stretch of the brass is about 0.18% whenever the temperature rises by 100° C. In the second embodiment, when the tension setting rollers 1 pull the wire electrode 6 so as not to slacken the wire electrode 6 during the annealing process, the stretching amount of the wire electrode 6 can be measured from the number of rotations of the tension setting rollers 1. This stretching amount includes not only a stretching amount by which the wire electrode 6 is stretched and plastically deformed by applying the tension to the wire electrode 6 but also heat stretch generated as a result of the temperature rise due to the heating of the wire electrode 6. In the second embodiment, the generated stretching amount is all handled as plastic deformation generated by the stretch. However, the stretching amount actually includes a heat stretching amount. When the stretching amount is all handled as plastic deformation, on the assumption that the line diameter of the wire electrode 6 is excessively reduced, the resistance value R' can be possibly calculated as a higher resistance value.

Figure 3:
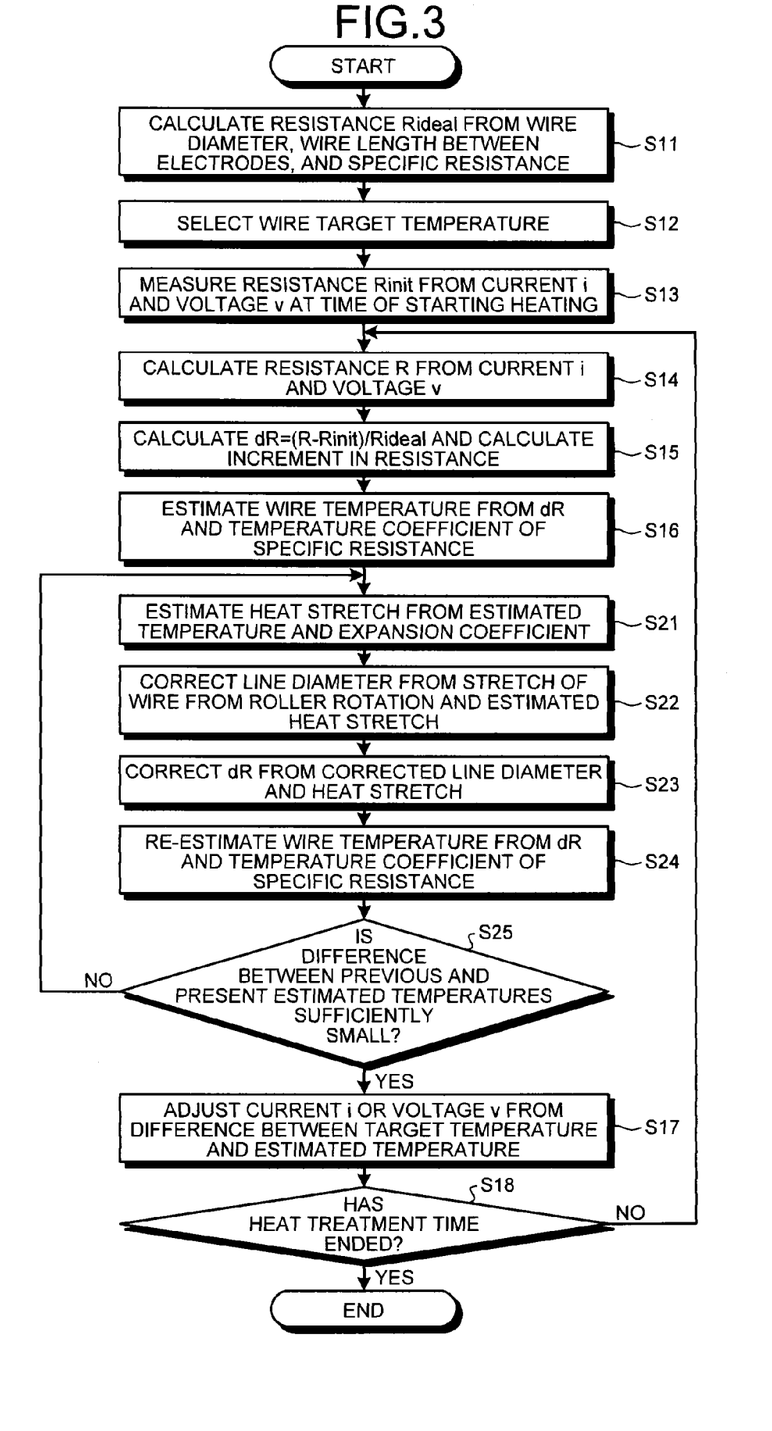
FIG. 3 is an example of a sequence of an annealing process when a correction is made in relation to stretch of a wire.

FIG. 3 is an example of a sequence of an annealing process when a correction is made in relation to stretch of a wire. Parts identical to those in the sequence according to the first embodiment shown in FIG. 2 are denoted by like reference signs, and explanations thereof will be omitted. In the present embodiment, in order to solve the problems above, the resistance value R' is calculated first, assuming, for example, that the measured stretch is all handled as plastic deformation caused by the stretch. The estimated temperature value is calculated from the dR, based on the calculated resistance value R'. Then, the heat stretch amount at the time of the estimated temperature is calculated (Step S21). Using a stretching amount obtained by subtracting the heat stretching amount from the measured stretching amount of the wire electrode 6 (Step S22), the resistance value R' is recalculated (Step S23). The dR is calculated based on the resistance value R' and the estimated temperature value is recalculated (Step S24). This calculation can be repeated until the estimated temperature does not change to some extent (Step S25). With this process, it is possible to more accurately estimate the temperature.

According to the present embodiment, the stretch of the wire electrode 6 due to the thermal expansion is calculated from the estimated temperature of the wire electrode 6. The length of the stretch due to the thermal expansion is subtracted from the stretching amount during the annealing process, and the increase in the resistance value due to the stretch of the wire electrode 6 is corrected. Therefore, when correcting the increase in resistance due to the stretch of the wire electrode 6, only the stretch caused by pulling, excluding the heat stretch of the wire electrode 6, is used for the correction of the temperature rise, thereby making it possible to improve the accuracy of estimating the temperature rise.

Fourth Embodiment

The specific resistance and the value of the temperature coefficient of the specific resistance represent the resistance value of an object at a certain temperature and how much the resistance value changes depending on the temperature. Since these are values for the object having a certain volume, so that the values are considered to include shape changes, such as expansion and stretch due to a temperature change. On the other hand, in the wire electric discharge machining device 100, the wire electrode 6 as a heating target is stretched when being heated. However, it is commonly known that an inter-electrode distance for carrying a current for heating the wire electrode 6 to the wire electrode 6 is fixed to the machining device and constant and does not follow the stretch due to the heating. Accordingly, when the heat stretch occurs to the wire electrode 6 in heating the wire electrode 6, ends of the wire electrode 6 gradually deviate from a current-carrying interval. As described in the first embodiment, when the resistance value of the wire electrode is measured from the voltage and the current between the electrodes, the length of the wire electrode 6 measured after the temperature rise is smaller, by the heat stretch, than that of the wire electrode 6 measured in a state of almost near a normal temperature right after the heating. If no consideration is given to the fact that the actually measured length of the wire electrode 6 is reduced by the heat stretch, a smaller increase in the resistance value is calculated and a smaller temperature rise is estimated.

To avoid this problem, after estimating the temperature with the method described in the first to third embodiments, it suffices to estimate the heat stretching amount of the wire electrode 6 from the estimated temperature and the expansion coefficient of the material of the wire electrode, and to correct the resistance value R of the wire electrode 6 by using this heat stretching amount. For example, in a case of a brass wire electrode, when the temperature rises by 200° C., it is considered that the wire length increases by about 0.36%. Therefore, it is considered that a value obtained by adding a resistance value corresponding to the stretch of 0.36% to the calculated resistance value R is an original resistance. Alternatively, it is considered to calculate the dR using a value obtained by subtracting the resistance value corresponding to the stretch from the resistance value Rideal or Rinit-Rbase of the wire electrode 6 used as the reference. However, because the Rinit is considered to include contact resistances and a wiring resistance in addition to the resistance of the wire electrode 6, it is not possible to correct the resistance value R for the stretching amount in this respect.

According to the present embodiment, the heat stretching amount due to the temperature rise of the wire electrode 6 is estimated based on the estimated temperature of the wire electrode 6 and the preset expansion coefficient, and the estimated increment in the resistance value of the wire electrode 6 is corrected based on this heat stretching amount. Therefore, by correcting the fact that the length of the wire electrode 6 the resistance of which is to be measured is substantially reduced by the heat stretch of the wire electrode 6, it is possible to more accurately estimate the temperature.

Fifth Embodiment

The brass wire electrode includes types of a relatively soft electrode referred to as "soft wire" in addition to a normally used wire (hard wire). The difference between the hard wire and the soft wire results from the difference in heat treatment after expansion processing. With reference to FIG. 53 of Non Patent Literature 1 mentioned above, it is indicated that the brass that is subjected to cold working without annealing and the brass that is subjected to annealing differ in electric resistance (specific resistance) despite the identical composition. Furthermore, it is understood that while the brass subjected to the annealing is almost equal in a value, the brass subjected to the cold working without annealing is higher in a value of electric resistance and smaller in a value of temperature coefficient, than the annealed wire. Moreover, both of the values approximate as the temperature rises and are expected to match each other at around 400° C. Both of the values approximate because it is considered that to raise the temperature of the brass that is subject to the cold working without annealing nearly means to perform the annealing on the brass.

According to the present embodiment described above, in a case of a brass wire, values of the specific resistance and the temperature coefficient to be used are set different between a hard wire and a soft wire. The values of the specific resistance and the temperature coefficient of the wire subjected to cold working without annealing are used for the hard wire, and those of the wire subjected to the annealing are used for the soft wire. It is thereby possible to estimate the temperature as described above. Furthermore, in a case of the hard wire, the value of the temperature coefficient of the specific resistance is switched to that after annealing at a temperature around 400° C., thereby making it possible to more accurately estimate the temperature equal to or higher than the temperature around 400° C.

INDUSTRIAL APPLICABILITY

As described above, the annealing processing method according to the present invention is useful as an annealing processing method for a wire electric discharge machining device that generates a discharge phenomenon between a workpiece and a wire electrode and that performs machining on the workpiece. Particularly, the annealing processing method is suitably used as an annealing processing method for a wire electric discharge machining device that arranges a pair of electrodes at predetermined two points on a wire electrode, respectively, that carries a current to the wire electrode via electrodes in a state of applying a tension to the wire electrode to heat the wire electrode, and that corrects a bending tendency between the two points.

REFERENCE SIGNS LIST 1 tension setting roller
2 first annealing electrode
3 first cutting electrode
4 second annealing electrode (also as second cutting electrode)
5 pinch roller
6 wire electrode
7 upper guide block
8 lower guide block
9 lower roller
10 recovery roller
60 storage unit
65 estimation unit
70 control unit
75 current-voltage measurement unit
80 control device
85 heating-power supply device
100 wire electric discharge machining device

The invention claimed is:

1. A wire electrode annealing processing method for a wire electric discharge machining device configured to generate a discharge phenomenon between a workpiece and a wire electrode to perform machining on the workpiece, to arrange each annealing electrode of a pair of annealing electrodes at predetermined two points on the wire electrode, respectively, to carry a current to the wire electrode via the annealing electrodes with a tension applied to the wire electrode, to heat the wire electrode, and to correct a bending tendency of the wire electrode between the two points, the method comprising:

measuring values of a current and a voltage from a heating power supply device heating the wire electrode by carrying the current to the wire electrode;

calculating a load resistance value during the heating by dividing the voltage value by the measured current value;

calculating a resistance increment of the wire electrode from an increased amount in the calculated load resistance value relative to another load resistance value right after starting the heating of the wire electrode, and from a resistance value of the wire electrode at room temperature;

estimating a temperature rise value of the wire electrode based on the calculated resistance increment, a preset specific resistance of the wire electrode, and a temperature coefficient of the specific resistance; and controlling a state of carrying the current to the wire electrode based on the estimated temperature rise value.

2. The method according to claim 1, wherein, based on a load resistance value Rinit right after starting the heating of the wire electrode, on a load resistance value R during the heating, and on an ideal resistance value Rideal of the wire electrode, a ratio of dividing a difference R-Rinit by the Rideal value is used as the resistance increment of the wire electrode.

3. The method according to claim 1, wherein, based on a load resistance value Rinit right after starting the heating of the wire electrode, on a load resistance value R during the heating, and on a resistance value Rbase from the heating power supply device to the wire electrode determined in advance, a ratio of dividing a difference R-Rinit by a difference Rinit-Rbase is used as the resistance increment of the wire electrode.

4. The method according to claim 1, further comprising:
setting a tension to be applied to the wire electrode during the annealing;
detecting an amount of stretch of the wire electrode during the annealing;
estimating a decrease in a cross-sectional area of the wire electrode based on the detected stretch amount;
calculating an increased amount of a resistance value of the wire electrode based on the estimated decrease; and
correcting an estimated amount of a temperature of the wire electrode by using the calculated increased amount.

5. The method according to claim 4, further comprising:
calculating stretch of the wire electrode due to thermal expansion from the estimated temperature of the wire electrode;
subtracting a length of the stretch due to the thermal expansion from a stretch amount during the annealing; and
correcting the resistance value increase due to the stretch of the wire electrode.

6. The method according to claim 1, further comprising:
estimating a heat stretching amount due to a temperature rise of the wire electrode based on an estimated temperature of the wire electrode and a preset expansion coefficient; and
correcting the calculated resistance increment of the wire electrode based on the heat stretching amount.

7. The method according to claim 1, wherein, in a case of using brass as the wire electrode, values of a specific resistance and a temperature coefficient are set differently between a hard wire and a soft wire, values of the specific resistance and the temperature coefficient subjected to cold working are used for the hard wire, values of the specific resistance and the temperature coefficient subjected to annealing are used for the soft wire, and the temperature coefficient of the specific resistance is switched to the temperature resistance after annealing at an estimated temperature in a range from 350° C. to 450° C. in a case of using the hard wire.

8. A wire electric discharge machining device configured to generate a discharge phenomenon between a workpiece and a wire electrode to perform machining on the workpiece, to arrange each annealing electrode of a pair of annealing electrodes at predetermined two points on the wire electrode, respectively, to carry a current to the wire electrode via the annealing electrodes with a tension applied to the wire electrode, to heat the wire electrode, and to correct a bending tendency of the wire electrode between the two points, the device comprising:

a heating power supply device that heats the wire electrode by supplying electric power to the wire electrode;

a current and voltage measurement unit that measures values of a current and a voltage from the heating power supply device that carries the current to the wire electrode;

an estimation unit that calculates a load resistance value during the heating by dividing the voltage value by the measured current value, calculates a resistance increment of the wire electrode from an increased amount in the calculated load resistance value relative to another load resistance value right after starting the heating of the wire electrode, and from a resistance value of the wire electrode at room temperature, and estimates a temperature rise value of the wire electrode based on the calculated resistance increment, a preset specific resistance of the wire electrode, and a temperature coefficient of the specific resistance; and a control unit that controls a state of carrying the current to the wire electrode based on the estimated temperature rise value.

9. The method according to claim 1, wherein the resistance value of the wire electrode at the room temperature is predetermined independently of the load resistance value calculated during the heating.

* * * * *